United States Patent
Rivlin et al.

(10) Patent No.: US 9,462,423 B1
(45) Date of Patent: Oct. 4, 2016

(54) QUALITATIVE AND QUANTITATIVE SENSOR FUSION FOR INDOOR NAVIGATION

(75) Inventors: Ehud Rivlin, Palo Alto, CA (US); Abhijit Ogale, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 355 days.

(21) Appl. No.: 13/180,890

(22) Filed: Jul. 12, 2011

(51) Int. Cl.
- H04W 24/00 (2009.01)
- H04W 4/04 (2009.01)
- H04W 4/02 (2009.01)

(52) U.S. Cl.
CPC .............. *H04W 4/043* (2013.01); *H04W 4/02* (2013.01)

(58) Field of Classification Search
CPC .... G01C 21/206; G01C 21/20; G01C 21/16; G01S 5/0027; G01S 19/06; G01S 19/235; G01S 19/25; G01S 19/252; G06T 19/003; H04W 4/043; H04W 64/00; H04W 4/027
USPC ....................... 455/456.1–457; 701/408, 409, 701/445–449, 454, 461–464, 467, 500–512, 701/540
See application file for complete search history.

(56) References Cited

U.S. PATENT DOCUMENTS

| | | | |
|---|---|---|---|
| 6,807,478 B2* | 10/2004 | Giannopoulos et al. | 701/434 |
| 8,284,100 B2* | 10/2012 | Vartanian et al. | 342/357.3 |
| 8,320,939 B1* | 11/2012 | Vincent | 455/456.1 |
| 8,386,422 B1* | 2/2013 | Kadous et al. | 707/609 |
| 2004/0033808 A1* | 2/2004 | Rorabaugh | 455/456.1 |
| 2006/0267833 A1* | 11/2006 | Langford et al. | 342/174 |
| 2007/0133487 A1* | 6/2007 | Wang et al. | 370/338 |
| 2008/0004042 A1* | 1/2008 | Dietrich et al. | 455/456.1 |
| 2011/0148633 A1* | 6/2011 | Kohlenberg et al. | 340/541 |
| 2011/0207471 A1* | 8/2011 | Murray et al. | 455/456.1 |
| 2012/0066035 A1* | 3/2012 | Stanger et al. | 705/14.1 |
| 2012/0130762 A1* | 5/2012 | Gale et al. | 705/7.13 |
| 2012/0143495 A1* | 6/2012 | Dantu | 701/428 |
| 2013/0029686 A1* | 1/2013 | Moshfeghi | 455/456.1 |
| 2013/0053056 A1* | 2/2013 | Aggarwal et al. | 455/456.1 |
| 2013/0172010 A1* | 7/2013 | Kang et al. | 455/456.1 |

\* cited by examiner

*Primary Examiner* — Allahyar Kasraian
(74) *Attorney, Agent, or Firm* — Marshall, Gerstein & Borun LLP

(57) ABSTRACT

A system and method for determining the location of a mobile device is provided. Such a method includes receiving an interior map, determining a first location to be an absolute location of a mobile communication device, locating the absolute location at a first position on the interior map, relocating the mobile communication device to a second location, estimating the second location of the mobile communication device based on an output of one or more sensors and modifying, using a computer-based system, the estimated second location based on a comparison of the estimated second location to the interior map.

20 Claims, 13 Drawing Sheets

600

| Sensor ID | Location 1 | Location 2 | Location 3 | Location 4 |
|---|---|---|---|---|
| ServerRoom1 | 12 | 11.2 | 10.3 | 2.0 |
| ServerRoom3 | 1.0 | 5.1 | 7.6 | -4.2 |
| Lobby Transmitter | 15 | 1.1 | 7.6 | -6.3 |
| Loading Dock | -33 | 4.1 | -8.55 | 15.2 |

Signal Strength (dbmV/M) — 604

| Bar Code ID | Location |
|---|---|
| 0000001 | Conference Room 200 |
| 0000002 | Lobby Front Desk |
| 0000003 | Laboratory Entrance |

| User ID | Step | Time Stamp |
|---|---|---|
| Jim | 1 | 12:00:32.3 |
| Jim | 2 | 12:00:33.4 |
| Jim | 3 | 12:00:35.1 |
| Jim | 4 | 12:00:36.2 |

820

| | ID | Step Size | Step rate information | Method | Position 1 | Position Two | Time stamp |
|---|---|---|---|---|---|---|---|
| 802a | Jim | 0.9 meters | | Manual Input | --- | --- | |
| 802b | Jim | 0.941 | 20 steps/55 seconds | Calculated | Bar Code | Wifi+Turn Detection | |
| 802c | Jim | 0.833 | 15 steps/40 seconds | Calculated | Bar Code | Bar Code | |
| 802d | Jim | 0.99 | 20 steps/50 seconds | Calculated | Wifi | Wifi | |
| 802e | Jim | .9091 meters | 11 steps/35 seconds | Calibration mode | 0 | +10 m | |

FIG. 8

QUALITATIVE AND QUANTITATIVE SENSOR FUSION FOR INDOOR NAVIGATION

BACKGROUND

1. Field

Embodiments relate generally to indoor location determination.

2. Background

Navigation systems using Global Positioning System (GPS) receivers can provide location information accurate to within a few meters, which is sufficient for providing driving instructions. For applications involving navigating on foot through a smaller space, such as within an indoor location, GPS systems may not provide sufficient accuracy to provide a walking user with navigation directions. Further, it may be difficult, if not impossible to receive GPS satellite signals inside of a facility. Wireless local area networks have become increasingly prevalent, and location systems using Wireless Fidelity (WIFI) routers have been used to determine locations with accuracies of tens to hundreds of meters. Although WIFI signals are easily received indoors, WIFI derived location information may not provide sufficient accuracy for assisting users to navigate within a facility.

BRIEF SUMMARY

The capability to determine the location of a mobile communication device in a facility such as the interior of a building is provided. Embodiments relate to systems and methods of determining a location for a mobile communication device and updating the location as the mobile communication device is moved within the facility.

In an embodiment, a system for indoor navigation is provided. The system includes an interior mapping system that stores a database of interior maps and an absolute location system that determines a first position of a mobile communication device to be an absolute location. The interior mapping system associates the absolute location with a position on an interior map. The system further includes a sensor system configured to estimate a second location of the mobile communication device subsequent to a relocating of the mobile communication device from the first position. In addition, a location modifier system can modify the estimated second location based on a comparison of the estimated second location to the interior map.

In an embodiment, a method of determining a location using an indoor map is provided. The method can be implemented on a computer and includes receiving an interior map and determining a first location to be an absolute location of a mobile communication device. The method includes locating the first position on the interior map, and relocating the mobile communication device to a second location, where an estimate is made of the second location of the mobile communication device based on an output of one or more sensors. The estimated second location is then modified based on a comparison of the estimated second location to the interior map.

In an embodiment, a computer program product is provided. The computer program product is a non-transitory computer readable storage medium on which a computer readable program code for interior navigation is embodied. The embodied computer readable code includes first computer readable program code for causing the computer to receive an interior map, second computer readable program code for causing the computer to determine a first location to be an absolute location of a mobile communication device, and third computer readable program code for causing the computer to locate the absolute location with a first position on the interior map.

The computer readable code further includes fourth computer readable program code for causing the computer to estimate the second location of the mobile communication device based on an output of one or more sensors in response to the mobile station being relocated to the second location, and fifth computer readable program code for causing the computer to modify the estimated second location based on a comparison of the estimated second location to the interior map.

Further embodiments and features, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings in which corresponding reference symbols indicate corresponding parts. Further, the accompanying drawings, which are incorporated herein and form part of the specification, illustrate the embodiments of the present invention and, together with the description, further serve to explain the principles of the invention and to enable a person skilled in the relevant art(s) to make and use the invention.

FIG. 6 illustrates a sample data table for storing signal signatures, according to an embodiment;

FIG. 7 illustrates a sample data table for storing passive localization information, according to an embodiment;

FIG. 8 illustrates a sample data table suitable for storing step size information, according to an embodiment;

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION

I. Introduction

While embodiments described herein are illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

Embodiments relate to determining the location of a mobile device within a confined space. Mobile communication devices such as smart phones and personal data assistants (PDA) have facilities for accessing and displaying graphical information, and contain sensors that can collect information about the surrounding environment. The mobile devices can also be configured to interpret the information collected from the sensors. As will be described in further detail below, embodiments leverage these facilities to enable a user of a mobile communication device to obtain location information within a confined space.

II. System Overview

Figure 1:
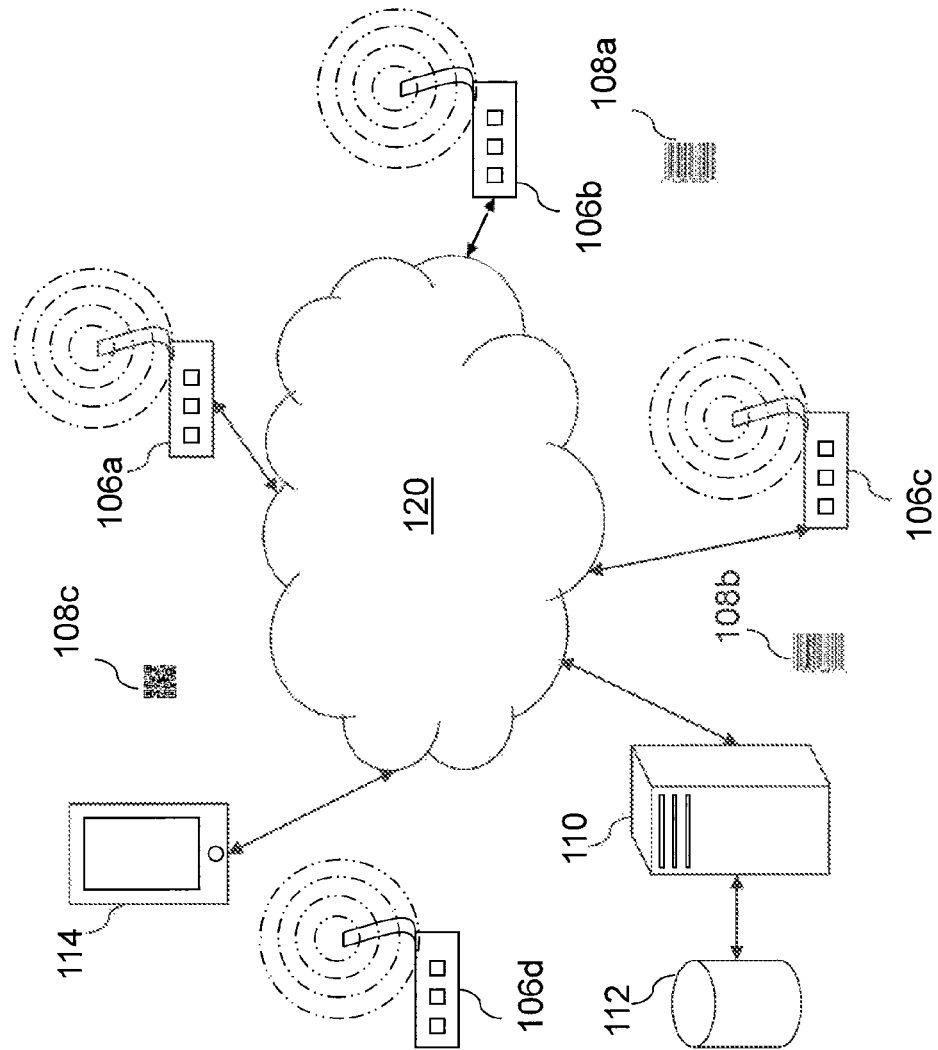
FIG. 1 is a diagram of an exemplary navigation system, according to an embodiment.

FIG. 1 is a diagram of a navigation system 100, according to an embodiment. In the example shown in FIG. 1, navigation system 100 includes a facility mapping server 110, a facility map database 112, active beacons 106a, 106b, and 106c, passive localization devices 108a, 108b, and 108c, a network 120, and a mobile communication device 114.

Facility mapping server 110 and facility map database 112 are components of an interior map delivery system. Facility map database 112 stores map data for a location, e.g., the interior of a building. The map data stored in facility map database 112 includes coordinate data and descriptive information for the facility and can include layout information giving coordinate data for pathways that can be traversed by persons within the location. In addition, map database 112 can store attributes associated with a position including images of specific areas of a building.

Facility mapping server 110 responds to requests for map data by retrieving data from facility map database 112 and delivering map data to the map requesting device such as mobile communication device 114.

Navigation system 100 can include active beacons, represented by 106a, and 106b, and 106c, that generate and transmit signals. The active beacons of navigation system 100 are located at various coordinates within the location. Active beacons 106a-106c generate signals that each have a distinctive signature that include information such as the generated signal strength of the signal and an identifier, where such information is encoded into the signal. The identifier allows a receiver of the signal to correlate the signal to the particular active beacon that transmitted the signal. For each active beacon, facilities map database 112 stores information describing the expected signal signature expected at one or more coordinates within the facility. Examples of active beacons include, without limitation, radio frequency transmitting device such as Wireless Fidelity (WIFI) routers configured to have a unique Media Access Control (MAC) address and active radio frequency identification (RFID) beacons.

Figure 13:
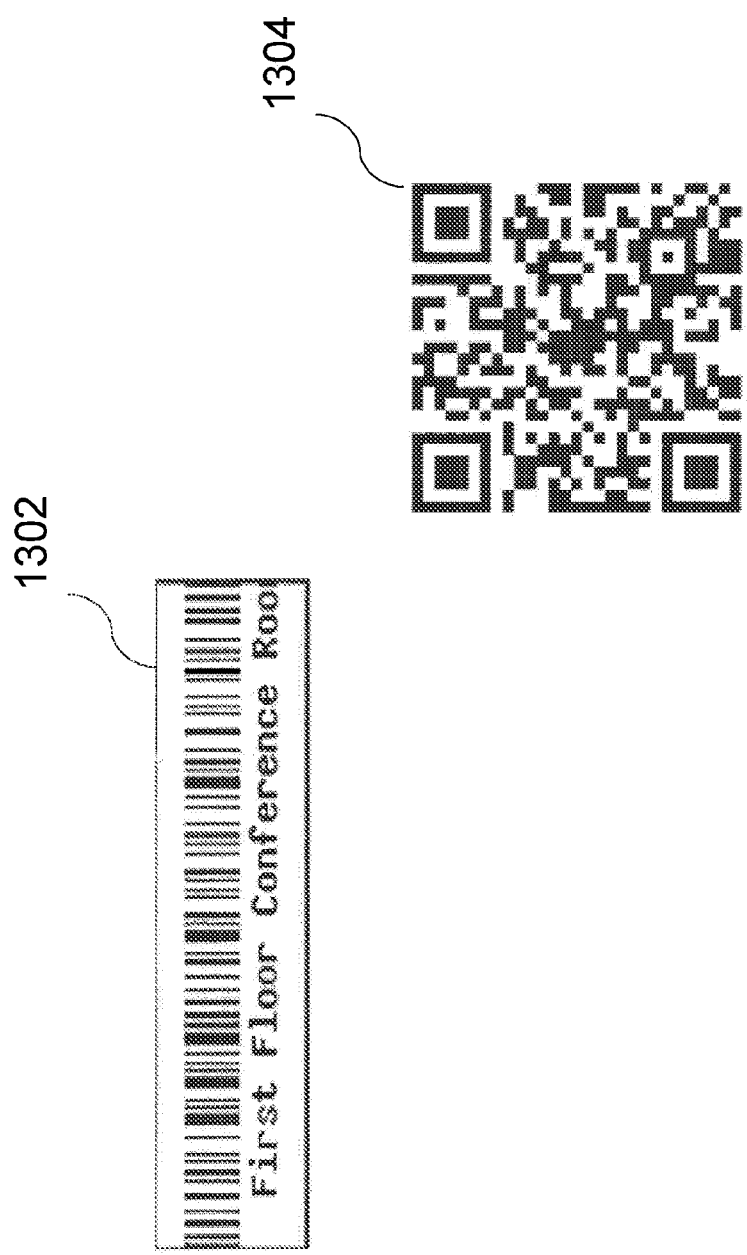
FIG. 13 illustrates a passive localization device, according to an embodiment.

Passive localization devices 108a, 108b, and 108c are located at various coordinates within the location. Passive location devices include an associated distinctive signature, where the signatures of passive location devices are detected by a reading device, e.g., bar code scanner, mobile communication device with scanning capabilities. Passive location devices include, for example, without limitation, one or two dimensional bar codes, such as barcode 1302 and QR code 1304 (shown in FIG. 13), and passive RFID tags. Facility map database 112 can store information describing the signature associated with the passive location devices, and information describing the coordinates of the location of the passive location device within the building. Alternatively, the location information can be encoded into the signature of the passive location device so that database queries to receive location information for the passive location device are not necessary.

Navigation system 100 determines the location of mobile communication device 114, which can be carried by a user to various locations in the facility. Mobile communication device 114 may include sensors for reading the signatures of passive localization devices 108a and 108b, and facilities for receiving the signals transmitted by one or more active beacons 106a, 106b, and 106c. Mobile communication device 114 can also be configured to request map data from mapping server 110 and to determine and display its location on an interior map of the facility. In some embodiments, mobile communication device 114 has the option to op-in to the detection and reading of signature, where personal or payload data is not captured or is removed to protect user privacy. Further, data received and/or transmitted by mobile commination device 114 need not include any payload information, but only that necessary to identify the location of a passive or active beacon device. In some embodiments, no personal data need be transmitted, and privacy protections are provided for any user data including, for example, anonymization of personally identifiable information, aggregation of data, filtering of sensitive information, encryption, hashing or filtering of sensitive information to remove personal attributes, time limitations on storage of information, or limitations on data use or sharing.

Network 120 connects the components of navigation system 100 to provide a communications path between mobile communication device 114, mapping server 110, and active beacons 106a-106c. Network 120 can include one or more networks, such as a local area network (LAN), a wide area network (WAN), the Internet, or a combination thereof.

The connections of the components to network 120 can be wired, wireless, or a combination of wired and wireless connections.

III. Mobile Device for a Navigation System

A mobile device, according to an embodiment will be described with reference to FIGS. 2, 3A, and 3B.

Figure 2:
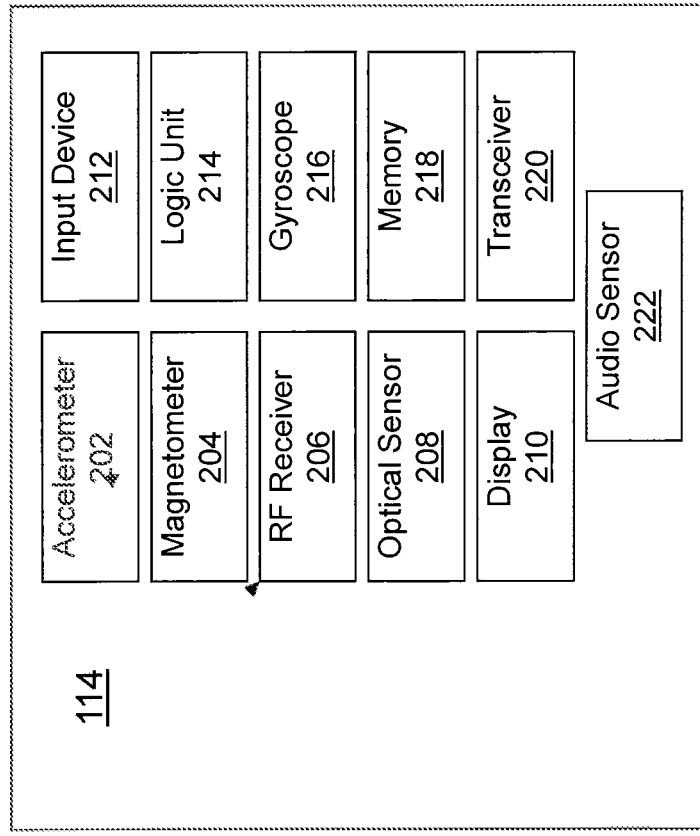
FIG. 2 is a block diagram schematically illustrating a mobile communication device, according to an embodiment.
Figure 3:
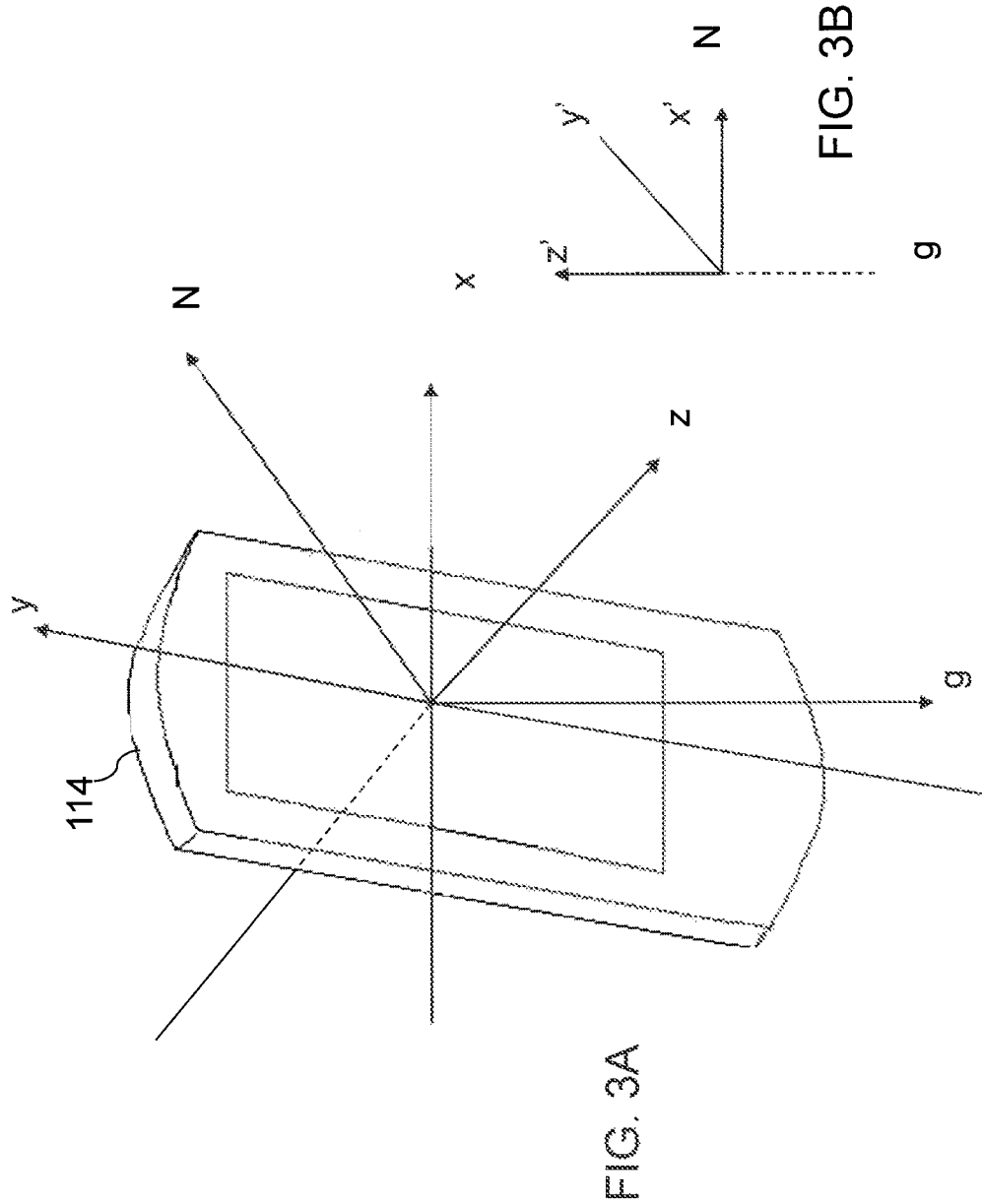
FIG. 3A is a diagram showing axes of a coordinate system having a fixed relationship to the mobile communication device, according to an embodiment.
FIG. 3B is a diagram showing a geocentric coordinate system, according to an embodiment.

Referring first to FIG. 2, mobile communication device 114 includes one or more sensors for determining the orientation and movement of mobile communication device 114, according to an embodiment. Mobile communication device 114 can include an accelerometer 202 capable of measuring acceleration imparted to the mobile communication device 114. In an embodiment, accelerometer 202 measures components of acceleration along three independent axes.

Referring now to FIG. 3A, an example axis system for accelerometer 202 is shown, according to an embodiment. Accelerometer 202 has a fixed relationship to the mobile communication device 114, and measures acceleration along axes x, y, and z. In an embodiment, the x axis for accelerometer 202 is parallel to a width dimension along the face of mobile communication device 114, the y axis for accelerometer 202 is perpendicular to the x-axis and is oriented along the face of mobile communication device 114. The z axis for accelerometer 202 is perpendicular to the x and y axes and extends outward from the face of mobile communication device 114. The accelerometer may have other orientations within the device provided that the orientation of the axes is known and that the component axes for measuring acceleration are independent (i.e. the three axes do not all lie in a single plane).

Mobile communication device 114 can include a compass for determining magnetic north. In the illustrated embodiment, mobile communication device 114 includes magnetometer 204 that generates information describing the vector direction of the magnetic field present at the location of mobile communication device 114. Mobile communication device uses information modeling the pattern of the earth's magnetic field at various locations on earth, and information describing the latitude and longitude of a location, to determine the direction of true north from the information obtained magnetometer 204.

In another embodiment, mobile communication device 114 includes gyroscope 216 and is configured to generate orientation information based on output signals generated by the gyroscope.

In an embodiment, mobile communications device 114 includes sensors for obtaining information from active beacons. For example, mobile communication device 114 can include a radio frequency receiver 206 capable of receiving RF signals from a radio frequency signal transmitter. For example RF receiver 206 can be a WIFI receiver cable of receiving transmissions from a wireless router. In an embodiment, receiver 206 can receive transmissions from active RFID beacons. In an embodiment, mobile communication device 114 can include an audio sensor 222 capable of sensing and/or receiving sounds either from ambient sources, an active sound beacon, or voice commands or input.

In an embodiment, mobile communication device 114 includes sensors for obtaining information from passive localization devices. For example, mobile communication device 114 can include an optical sensor 208 to implement a camera for capturing a query image whereby the query image can be compared to stored reference images of locations in the facility to derive a location for the mobile communication device. Mobile communication device 114 can be configured to use optical sensor 208 to scan codes, such as one or two dimensional barcodes located in a facility and to obtain location information based on interpreting the barcodes.

In an embodiment, RF receiver 206 can include a device that includes an RFID transmitter for transmitting to a passive RFID tag and/or a RFID receiver for reading signature information returned from a passive RFID tag.

In an embodiment, mobile communication device 114 can also include transceiver 220 for communicating with external devices. In an embodiment, transceiver 220 is a wireless transceiver for transmitting and receiving information from devices connected to network 120 of navigation system 100 shown in FIG. 1.

Mobile communication device 114 further includes a logic unit 214 that implements a control system that determines the function and operation of the mobile communication device. Logic unit 214 may be implemented using hardware or software or a combination of hardware and software arranged and configured to implement functionality in accordance with various embodiments. Software, sensor data, and information such as the final and intermediate results of calculations can be stored in memory 218 included in mobile communication device 114.

In an embodiment, mobile communication device 114 includes one or more input devices 212 that receive input data from a user and provide the input data in a form readable by logic unit 214. Input device 212 may include, without limitation, devices such as a keypad, touch screen, pointer device, or microphone to allow speech input.

Operation of multiple embodiments of a navigation system will be described with reference to FIGS. 1, 2, and 4.

Figure 4:
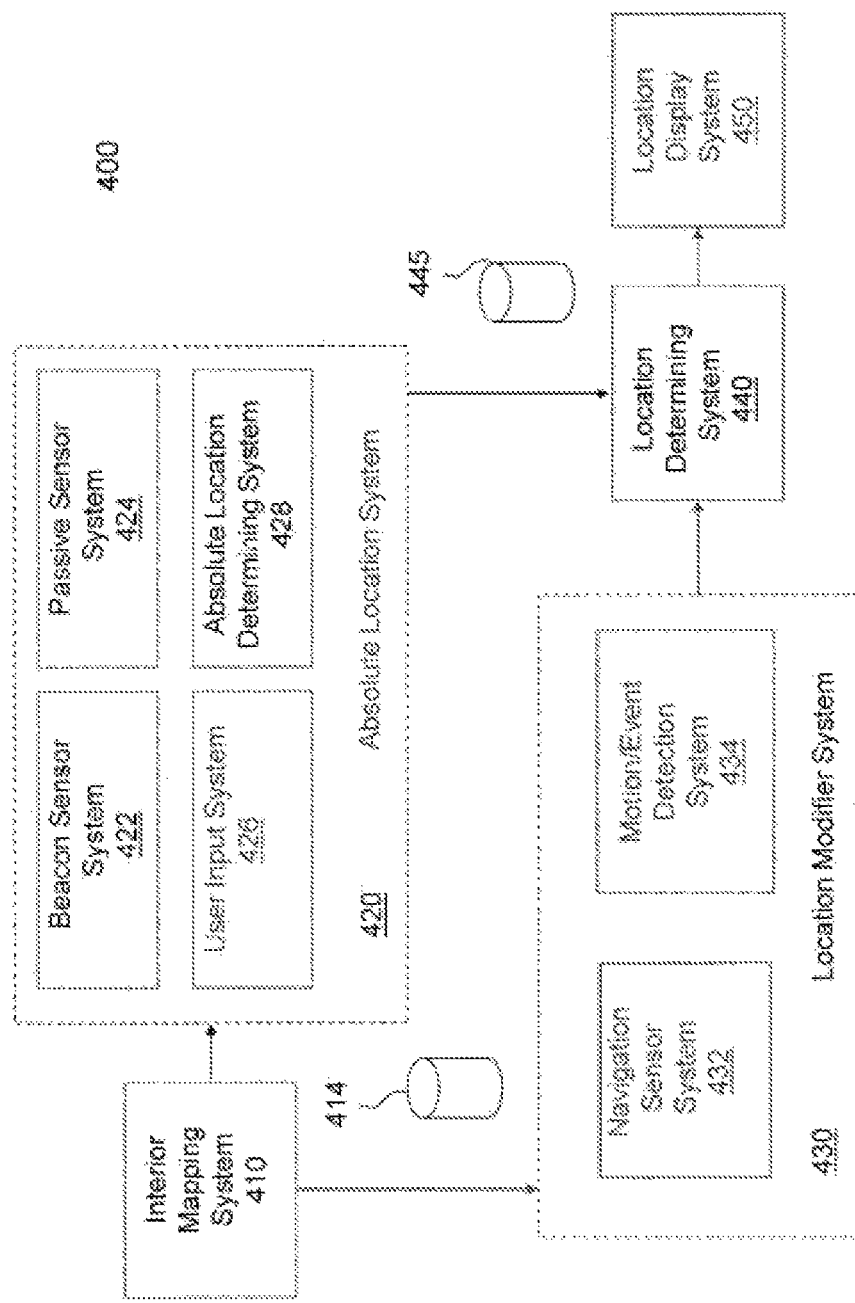
FIG. 4 is a block diagram schematically illustrating functions implemented on a mobile communication device, according to an embodiment.

FIG. 4 illustrates navigation system 400, according to an embodiment. Navigation system 400 includes interior mobile mapping system 410, absolute location system 420, location modifier system 430, location determining system 440, and location display system 450.

In an embodiment, interior mobile mapping system 410 is configured to respond to requests for map information in support of other components of navigation system 400. Interior mobile mapping system 410 responds to requests for map information, for example, by querying interior mobile mapping system 410 using information from the request.

Referring now to FIGS. 1 and 2, interior mobile mapping system 410 of mobile communication device 114 can be configured to implement navigation system 400, including the transmitting of a request for map information to facility mapping server 110, using transceiver 220, and network 120. Facility mapping server 110 retrieves the map information from facility map database 112 and transmits the retrieved map information to mobile communication device 114. Interior mobile mapping system 410, in conjunction with mobile communication device 114 stores map information in mobile mapping database 414 of the interior mapping system.

In an embodiment, the map information describes the interior layout for a facility and includes, without limitation, coordinate information describing the location, including information such as descriptive names for rooms, corridors, and walkways within the location, the coordinates of landmarks and significant areas (e.g. front desk, elevators, and stairwells) within the location, and coordinates and parameters associated with active beacons and passive localization devices within the location.

A. Absolute Location System

Navigation system 400 includes an absolute location system 420 that determines a position for a mobile communication device 114 by capturing sensor information from location based devices at known coordinates in a building, according to an embodiment. Absolute location system 420 includes a beacon sensor system 422, a passive sensor system 424, a user input system 426, and an absolute location determining system 428.

In an embodiment, beacon sensor system 422 is configured to collect information from active beacons using sensors, such as those in mobile communication device 114, to determine a first location for mobile communication device 114 using active localization.

Active beacons generate and transmit signals that can be received by mobile communication device 114. The transmitted signals are characterized at least by a signal strength transmitted by the active beacon, and by the inclusion of a distinctive signature that allows the identification of the transmitting source of each signal received by mobile communication device 114. In an embodiment, an active beacon can be a device such as a wireless router or other WIFI device that transmits a radio frequency signal. The transmitted WIFI signal can include identifying information such as an SSID that distinguishes the wireless transmitter from all other WIFI transmitters within range of mobile communication device 114. In some embodiments, such identifying information need not include any payload information, but only that necessary to identify the location of a passive or active beacon device. Further, in some embodiments, no personal data need be transmitted, and privacy protections are provided for any user data including, for example, anonymization of personally identifiable information, aggregation of data, filtering of sensitive information, encryption, hashing or filtering of sensitive information to remove personal attributes, time limitations on storage of information, or limitations on data use or sharing.

In an embodiment, beacon sensor system 422 of mobile communication device 114 is configured to receive one or more active beacon signals and to extract the signature information from a received signal. The mobile device can also be configured to measure the received signal strength from the one or more beacons.

Beacon sensor system 422 is configured to retrieve information describing the expected signal strength of the one or more received active beacon signals by sending a request for map information to mobile mapping system 410. The request can include identifying information based on the signature information extracted by beacon sensor system 422. In response to receiving the request from beacon sensor system 422, interior mapping system server 412 queries interior mobile mapping database 414 to obtain identifying information for the one or more active beacons.

FIG. 6 illustrates an example data table for storing active beacon information, according to an embodiment. Records 602a, 602b, 602d, and 602d each contain signal strength information for active beacons 106a, 106b, 106c, and 106d respectively. Fields 604 can include information describing the signal strength for a respective active beacon at various points within a location.

In response to the query from interior mapping system 410, database 414 can return the expected signal strength information for the one or more active beacons to interior mapping system 410 by retrieving one or more records from table 600 corresponding respectively to the signature information from an active beacon received at mobile communication device 114. In an embodiment, interior mapping system server 412 is configured to send the retrieved signal strength information to beacon sensor system 422.

Beacon sensor system 422 can be configured to determine coordinates of an estimated position based on a comparison of the measured signal strength information from the active beacons and the expected signal strength information retrieved from the mobile mapping system 410. In an embodiment, the determination of the coordinates of the estimated position includes a determination of the estimated uncertainty of the position determined from the signal strength information.

In an embodiment, passive sensor system 424 is configured to collect information from one or more passive localization devices using sensors in mobile communication device 114 and to estimate coordinates based on the collected passive localization device information. An example embodiment will be described that employs bar codes as the passive localization device.

Referring again to FIG. 1, bar codes 108a and 108b are located at different locations within a building. In an embodiment, mobile communication device 114 is configured to optically scan bar codes, such as bar codes 108a or 108b using optical sensor 208 and to retrieve information encoded in the bar code. In an embodiment, the bar code information can contain an identifier for the bar code. Passive sensor system 424 can be configured to request the location of the bar code by sending a request to mobile mapping system 410 that includes the identifying information scanned from the bar code.

In response to receiving the request from beacon sensor system 422, interior mapping system server 412 queries interior mobile mapping database 414 with the identifying information from the bar code scanned by passive sensor system 424 to obtain the associated location information of the bar code.

FIG. 7 illustrates an example data table 700 for storing passive beacon, e.g., bar code, information in accordance with an embodiment. Records 702a, 702b, and 702c, each contain information for a respective bar code marker affixed to a position within a location. Field 704 for each record includes location information such as coordinates at which the bar code marker is affixed.

In an embodiment, a bar code can include information describing the coordinates of the bar code. Passive sensor system 424 can be configured to determine a location for the bar code by interpreting the bar code, and therefore the step of retrieving the coordinates of the bar code using identifying information can be omitted.

In an embodiment, passive sensor system 424 determines the estimated location of the mobile device to be the location determined for the barcode. Passive sensor system 424 can be configured to determine an accuracy for the position determined by the passive location system. In an embodiment, the passive location system can be configured to determine that the accuracy for passive locations is appreciably higher than the accuracy of positions determined by beacon sensor system 422.

In an embodiment, passive sensor system 424 can be configured to determine an estimated location of the mobile device using image comparison. For example, mobile communication device 114 can be configured to capture an image of an interior location using optical sensor 208. In an embodiment, passive sensor system 424 can be configured to send a request for a stored captured image of the interior location from mobile mapping database 414 that may include corresponding location information associated with the stored captured image.

Absolute location determining system 428 receives estimated position information generated by one or more of beacon sensor system 422, passive sensor system 424, and user input system 426 to determine estimated coordinates for mobile communication device 114. User input system 426, in an embodiment, receives information from a user, such as through mobile communication device 114 that relates to a specific location.

Location determining system 440 receives information from location modifier system 430 and absolute location system 420 to determine an estimated location for mobile communication device 114. In an embodiment, location determining system 440 can be configured to store estimated positions for mobile communication device 114 in location database 445. Location determining system can be implemented as part of a server system, such as mapping server 110, or in a client device such as mobile communication device 114, or as a combination client/server approach using both a server system, such as mapping server 110, and a client device, such as mobile communication device 114.

Location display system 450 can be configured to display an estimated location determined for mobile communication device 114. In an embodiment, location display system 450 can be configured to display an interior map on display device 210. Location display system 450 can be configured to generate a request for information surrounding an estimated position for mobile communication device 114 from mobile mapping system 410. In response to the request, interior mapping system server 412 retrieves information describing the facility layout from the mobile mapping database 414 and returns the retrieved map information to location display system 450. Location display system 450 can be configured to display the estimated position for mobile communication device 114 as a location plotted on display device 210 of mobile communication device 114.

Figure 9:
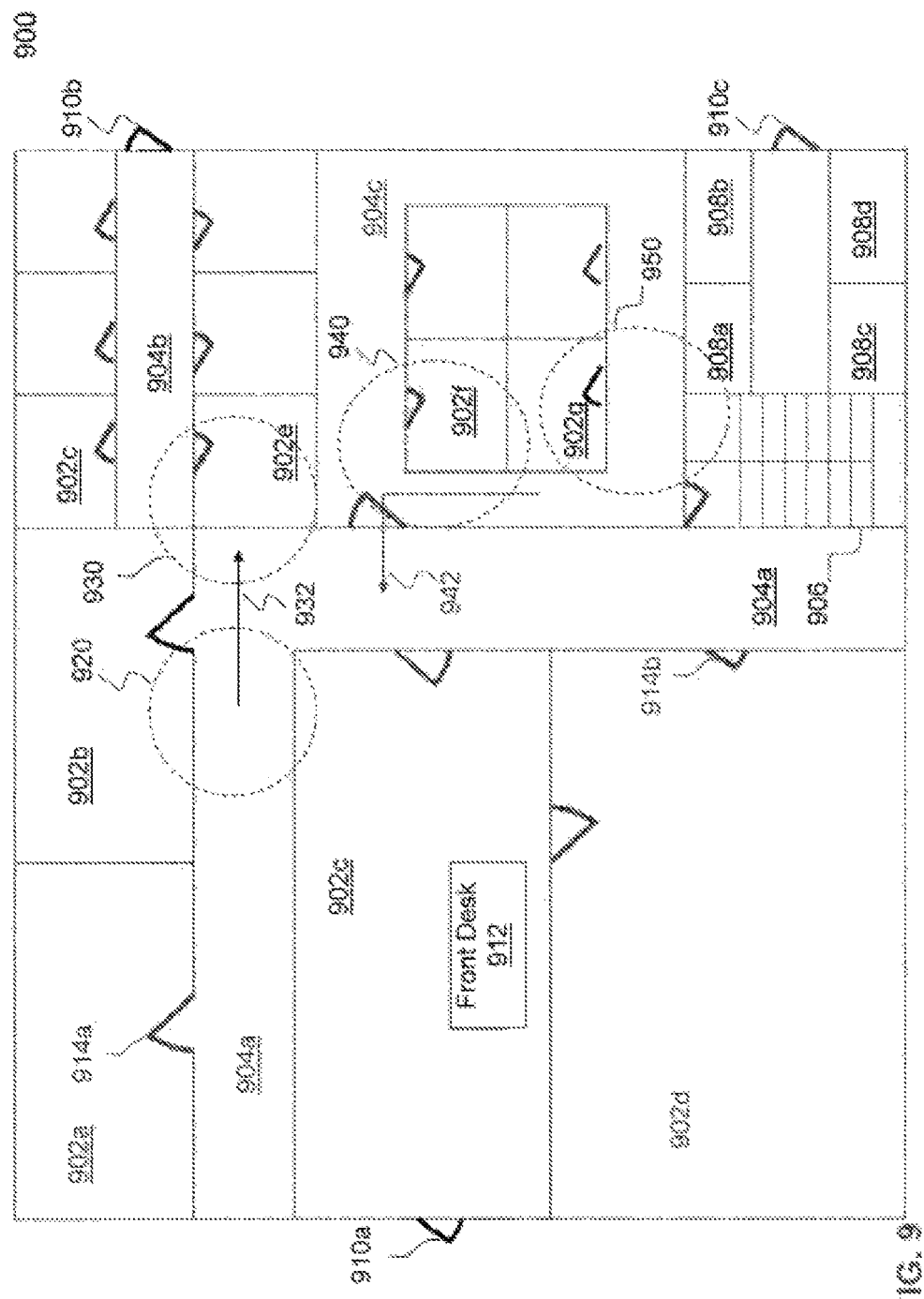
FIG. 9 illustrates an interior map, according to an embodiment.

FIG. 9 illustrates an example interior map 900 according to an embodiment. Interior map 900 shows layout of pathways that a user can traverse in the interior of a location. For example, interior map 900 graphically depicts the position and extent of rooms such as offices 902a, 902b, and 902d, lobby area 902c, conference room 902d, corridors 904a, 904b, and 904c, stairwell 906, elevators 908a, 908b, 908c, and 908d, building entry points 910a, 910b, and 910c, front desk 912, and interior doors 914a and 914b. Interior map 900 also indicates a present position of mobile communication device 114 at region 920. The dashed circle surrounding region 920 indicates the range of values for the estimated position determined by absolute location determining system 428. In an embodiment, location display system 450 is configured to generate a request for information surrounding an estimated position for mobile communication device 114 from mobile mapping system 410. In response to the request, interior mapping system server 412 retrieves information describing the building layout from mobile mapping database 414 and returns the retrieved map information to location display system 450 as a position plotted on display device 210 of mobile communication device 114. In an embodiment, location display system 450 can display an estimate of the uncertainty in the estimated position for mobile communication device 114.

User input system 426 can be configured to receive user input information for determining absolute location information for mobile communication device 114. In an embodiment, user input system 426 receives information from one or more input devices 212 of mobile communication device 114. For example, mobile communication device 114 can be configured to display a user interface for receiving user input identifying an initial location of the mobile communication device 114 and to receive information from a user input device such as a keypad or touch screen selecting the initial position.

Absolute location system 420 can be configured to retrieve map information from mobile mapping system 410 and to send the map information to mobile communication unit 114 to display an interior map for the location. In an embodiment, a user can select a position displayed on the map as a first location. For example, mobile communication device 114 may provide a touch screen as an input device and can receive a touch signal from user input system 426 indicating a selection of the representation on display 210 of front desk 912 in lobby 902c as the current location for mobile communication device 114.

In an embodiment, absolute location determining system 428 can receive input from user input system 426 to resolve uncertainties in the location determined by a component such as beacon sensor system 422 or passive sensor system 424. Referring again to FIG. 9, interior map 900 shows an estimated position 920 that overlaps with office 902b, lobby area 902c, and corridor 904a. In an embodiment, a user input system 426 can receive a touch screen input indicating which of the areas within estimated position 920 represents an accurate location for mobile communication device 114. For example, the user can indicate by touching the area of the map presented on display 210 that the user and mobile communication device 114 are actually in corridor 904a.

B. Location Modifier System

Location modifier system 430 determines information for modifying the estimated location information determined by absolute location system 430. In an embodiment, the current location of mobile communication device 114 changes as the user moves through the building. The location of the user is constrained by the layout of the building. For example, a user can walk within a room or through a corridor in a building and can use exits, doorways, elevators, and stairwells. However, the user is constrained from passing through solid objects such as room walls, structural members and other non-traversable objects positioned within the interior. In addition, a user traversing the building by walking cannot traverse from one location to another in a shorter time period than allowed by the user's walking or running speed.

A location modifier system suitable for practicing embodiments of the invention will be described below with reference to FIGS. 2, 3A, 3B, 4, and 5. Location modifier system includes navigation sensor system 432 and motion and event detection system 434 as subsystems.

Navigation sensor system 432 receives input from one or more sensors within mobile communication device 114 and generates information describing the orientation and acceleration of mobile communication device 114.

In an embodiment, navigation sensor system 432 receives input from accelerometer 202 and magnetometer 204 that generates output signals to indicate the orientation and acceleration of mobile communication device 114.

The acceleration on mobile communication device 114 is produced by the operation of the force of gravity on the device combined with the acceleration exerted by forces that create motion of the device. As a user walks though the interior of a location carrying mobile communication device 114, the force of gravity exerts an essentially constant acceleration g, in a downward direction g having a magnitude of about 9.81 meters per second$^2$ (m/s$^2$). The user's motion while walking on a level surface generates an acceleration component in the direction of motion of the user as well as components in other directions (for example an upward component of motion of the user) characteristic of the user's stride while walking through the building.

Navigation sensor system 432 is configured to receive acceleration data from accelerometer 202 that indicates the components of acceleration of the mobile communication device along the x, y, and z axes shown in FIG. 3A. As discussed above, the x, y, and z axes are fixed relative to mobile communication device 114.

In an embodiment, navigation sensor system 432 is configured to determine components of acceleration along the x, y, and z axes that are due to the force of gravity, which acts along axis g pointing downwards and to determine components of acceleration due to motions imparted to mobile communication device resulting from the user's walking motion. For example, the navigation sensor system 432 can be configured to distinguish between the components of acceleration due to gravity along the x, y, and z axes from components of acceleration due to the user's motion while walking through the interior of a location using frequency information contained in the accelerometer signal. The acceleration components due to gravity are constant values for a given orientation of mobile communication device 114, while the components of acceleration due to user walking motions are time varying components for a given orientation of mobile communication device 114.

In an embodiment, navigation sensor system 432 receives compass information from magnetometer 204 and generates information identifying the direction of true north based on the received magnetometer sensor information. Gyroscope 216 may be used to accurately determine relative orientation changes over short durations. Gyroscope data may be combined with the magnetometer and accelerometer data to produce accurate estimates of absolute orientation.

In an embodiment, navigation sensor system 432 is configured to convert orientation and acceleration values measured in the device based coordinate system into a geographic based coordinates. FIG. 3B shows an example geographic based coordinate system having an x' axis that points in the direction of true north, a y' axis oriented perpendicular to the x' axis in a horizontal plane, and a vertical z-axis parallel to the direction of the earth's gravitational field, according to an embodiment.

In an embodiment, navigation sensor system 432 can be configured to determine the orientation and acceleration components in a geographic coordinate system, such as the x', y', z' coordinate system show in FIG. 3B, by using mathematical coordinate transform algorithms known in the art from the acceleration components measured using the accelerometer, and the directions of true north measured using the magnetometer signal, and from information describing the direction of the g-axis in the x, y, z coordinate system determined from the accelerometer data and relative orientation changes obtained from the gyroscope. Navigation sensor system 432 can be configured to generate signals representing the acceleration of mobile communication device 114 in a geographic coordinate system.

Motion and event detection system 434 receives acceleration signals output by navigation sensor system 432 and generates output signals that identify events and motion information for mobile communication device 114. In an embodiment, motion and event detection system generates signals indicating the direction of motion of the mobile communication device, steps made by a user walking through the location while carrying the mobile device, and one or navigational events occurring while walking through a location, including, but not limited to turns, stair climbing, and riding of elevators.

Figure 5:
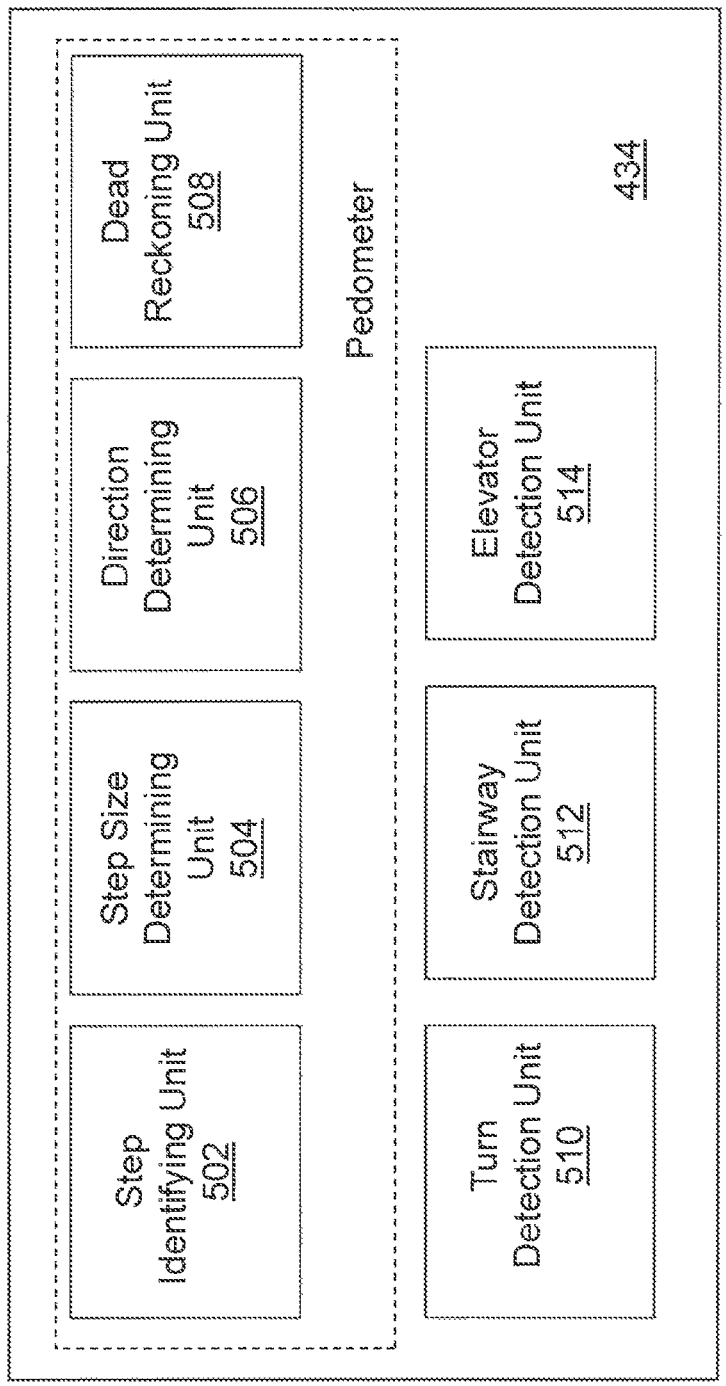
FIG. 5 is a block diagram schematically illustrating functions implemented by a motion and event detection system, according to an embodiment.

FIG. 5 illustrates functional components of motion and event detection system 434, according to an embodiment. Motion and event detection system 434 includes a step identifying unit 502, a step size determining unit 504, a direction determining unit 506, a dead reckoning unit 508, a turn detection unit 510, a stairway detection unit 512, and an elevator detection unit 514.

Step identifying unit 502, step size determining unit 504, direction determining unit 506, and dead reckoning unit 508 are each configured to perform a pedometer function that detects motion by identifying and counting user's steps, determines the direction of the user's motion and step size, and determines the user's change in position while walking.

Step identifying unit 502 can be configured to identify a user step by analyzing a signal that describes the acceleration of mobile communication device 114 while being carried on the person of a user.

Walking motions generate an acceleration pattern that includes vertical acceleration peaks generated as the each foot contacts the floor or ground. In an embodiment, step identifying unit 502 is configured to identify peaks in a signal provided by navigation sensor system 432 corresponding to the vertical (z' axis) component of acceleration due to the motion of the mobile device sensor. Step identifying unit 502 can be configured to store step information and time stamp information for each step.

Table 810 shown in FIG. 8 shows an example table for storing step information, according to an embodiment. As can be appreciated from FIG. 8, step identifying unit 502 can be configured to store time stamp information indicating the time associated with each step detected by step identifying unit 502.

Step size determining unit is configured to determine the size of steps identified by step identifying unit. In an embodiment, step size determining unit can be configured to receive a step size manually input or selected by a user via input device 212. Step size determining unit can be configured to store manually entered step size information in a data table stored in memory, and to retrieve and transmit the step size information in response to a request from another system such as absolute location system 420.

FIG. 8 shows an example data table 820 storing data that can be suitable for storing step size data in location database 445 in an embodiment.

Records 802a, 802b, 802c, 802d, and 802e each contain records describing a step size determination. Field 804 of each record indicates the step size determined using step size determining unit 504. Field 806 contains step rate information calculated by measuring the number of steps detected and counted over an interval by step identifying unit 502. Field 808 contains information indicating the method used to make the step size determination. Fields 810 and 812 contains information describing the start and stop coordinates used for calculating the step size. In an embodiment, coordinate fields 810 and 812 can also include information allowing an estimate of the accuracy of the position information contained in the respective fields. Field 814 of table 820 includes time stamp information indicating the time and date for the step size determination.

Record 802a holds data for user Jim that describes a manually entered step size. Field 804 of record 802a contains information indicating a step size of 0.9 meters, while method field 808 indicates that the step size was manually entered. Field 814 contains time stamp information indicating the time and date at which the step size was entered.

In an embodiment, step size determining unit 504 can be configured to determine or update the step size using position information determined by the location database 445. The user's step size can be calculated by dividing the distance covered by the user by the number of steps used to cover the distance.

Referring again to FIG. 8, record 802*b* of table 820 contains information stored by step size determining unit 504 during a step size determining operation. In an embodiment, step size determining unit 504 retrieves pairs of stored values of the coordinates information determined by location determining system 440, and the step count and frequency information for the user's steps in traveling between the two coordinates as determined and stored by step identifying unit 502, and computes a value for the step size. Step size determining unit then stores the value for step size and other relevant parameters in table 820.

For example, field 804 of record 802*b* contains the value of the step size determined by step size determining unit 504. Field 806 of record 802*b* contains the step count and step rate information for the steps used in the step size determination. Method field 808 of record 802*b* indicates that the step size was determined by calculation. Fields 810 and 812 contain the coordinate information for the start and stop positions used to determine the step size, and indicate that the start and stop positions were determined using bar codes and positional estimation using an active beacon and compass. Field 814 of record 802*b* indicates the time and date for the step size determination.

In an embodiment, step size determining unit can be configured to use the data stored in table 820 as historical step size data, and to retrieve the historical step size data stored in table 820 for use in subsequent step size determinations.

In an embodiment, step identifying unit 502 and step size determining unit 504, alone or in combination, can be configured to implement a training mode. For example, the step size determining unit 504 can be configured to collect acceleration patterns generated while the user paces off a known distance when the user selects a calibration mode using user input device 212. The step size determining unit 504 can also be configured to receive user input describing the distance paced off and the number of steps taken by the user. The collected acceleration pattern information can be stored for retrieval by step identifying unit 502 to be used in a pattern comparison operation to identify steps by the user, while the step count and distance information can be stored and used during step size determining operations by step size determining unit 504.

Referring again to FIG. 8, record 802*e* of table 820 illustrates an example of data stored in a calibration mode operation in an embodiment. In record 802*e*, field 804 contains the step size value determined during the calibration operation, field 806 contains step rate information indicating that 11 steps were taken in 35 seconds during the calibration operation, field 808 indicates that the step size determination was made during a calibration operation, and fields 810 and 812 indicate that the user traveled 10 meters during the calibration operation.

In an embodiment, step size determining unit 504 can be configured to correlate step size with step rates when determining a current step size. For example, step size determining unit 504 can be configured to determine a current step rate by determining the time interval between steps identified by step identifying unit 502. Step size determining unit 504 can be configured to retrieve historical step size data stored in table 820, and to determine the current step size based on previously determined step sizes that are associated with step rates that are close matches for the current step rate.

Direction determining unit 506 is configured to determine the direction of motion of the user as the user walks through the building. In an embodiment, direction determining unit determines the direction of motion of the user from signals generated by the user corresponding to acceleration of the mobile device in the horizontal direction (x'/y' plane in FIG. 3B) including corresponding acceleration information from a navigation sensor system, e.g., navigation sensor system 432. The compass and gyroscope data may be combined with the acceleration data to produce absolute heading.

Dead reckoning unit 508 computes a modification to the absolute position determined by absolute location system 420 that reflects the motion of the user. In an embodiment, dead reckoning unit 508 is configured to estimate the distance traveled from a previously determined position using step count information generated by step identifying unit 502, step size information generated by step size determining unit 504, and direction of motion information generated by direction determining unit 506 and estimates a change in position produced by a user's walk through the interior. Dead reckoning unit 508 generates an output signal corresponding to the estimated change in position.

Turn detection unit 510 identifies changes of direction in the user's motion that constitute turns. In an embodiment, turn detection unit receives a signal generated by direction determining unit 506 indicating the estimated direction of motion. Turn detection unit can be configured to identify turns by detecting changes in the direction of motion of travel. For example, turn detection unit can identify that a turn has occurred when the change in the direction of motion exceeds a threshold value. In another embodiment, turn detection can identify that a turn as occurred when the rate of change of the direction of motion exceeds a threshold value.

In an embodiment, stairway detection unit 512 analyzes accelerometer data generated by navigation sensor system 432 to detect acceleration patterns that indicate that a user carrying mobile communication device 114 is climbing or descending stairs.

The acceleration component pattern for a user walking up steps differs from the acceleration component pattern generated while walking on a horizontal surface. In particular, the vertical components for the motion of acceleration are increased for each step during climbing and descending stairs. In an embodiment, stairway detection unit 512 can be configured to identify increases in the vertical components of the acceleration signal generated by navigation sensor system 432. In another embodiment, stairway detection unit 512 can be configured detect that a user is climbing a stairwell by using the result of a comparison of the acceleration component pattern to a stored patterns obtained for the user while climbing or descending stairwell.

Similarly, the acceleration component pattern for a user riding an elevator differs from the acceleration component pattern generated while walking on a horizontal surface. In particular, the horizontal components generated while riding on the elevator are small, while the vertical components indicate momentary upward or downward acceleration as the elevator starts to move, and then a momentary deceleration in the opposite direct as the elevator comes to a stop. In an embodiment, elevator detection unit 514 can be configured to recognize the characteristic acceleration and deceleration pattern for a user riding on an elevator and to generate an output signal indicating that the user of mobile communication device 114 is on an elevator. For example, elevator detection unit 514 can be configured detect that a user is riding in an elevator using the result of a comparison of the acceleration component pattern to a stored patterns obtained for the elevator. In an embodiment, elevator acceleration/deceleration patterns can be stored as map data in facility map database 112, and can be stored for retrieval by elevator detection unit 514 in mobile mapping database 414.

In an embodiment, location determining system 440 is configured to receive a first position for mobile communication device 114 determined by absolute location system 420, and to receive location modifying information determined from one or more components of location modifier system 430. Further, location determining system 440 is configured to receive map information from mobile mapping system 410 to determine a second location for mobile communication device 114.

For example, location determining system 440 can be configured to provide an update to the first position for mobile communication device 114 to obtain a second position for mobile communication device 114 using sensor information that reflects motion of the user in the interior of the location.

In an embodiment, location determining system 440 obtains a signal generated by dead reckoning unit 508 of motion/event detection system 434. Location determining system 440 can be configured to increment position information determined by the absolute location system 420 with the position change data generated by dead reckoning unit 508 to obtain an estimated second location.

Location determining system 440 can refine the second location determined using position change information with information determined from map information data retrieved from mobile mapping system 410.

Referring again to FIG. 9, dashed circle 930 represents a second location computed by updating position 920 based on direction of movement along path 932 as determined by dead reckoning unit 508. The area of uncertainty indicated in the region enclosed by dashed circle 930 includes office 902e, conference room 902b, and corridors 904a and 904b. Location determination unit can determine from the retrieved map information, that there are no entrances allowing a user to enter office 902e or corridor 904b that can be reached along path 932 and therefore can constrain the second location to be within the regions of circle 930 that lie within conference room 902b and corridor 904a.

In an embodiment, location determining system 440 can be configured to receive event detection information generated by one or more event detection units of motion and event detection system 434 to refine the estimated second position determined for mobile communication device 114.

Referring again to FIG. 9, dashed circle 940 indicates an estimated second location determined by location determining system 440. Dashed circle 904 overlaps with cubicles 902f, 902g, and corridor 904c. In an embodiment, location determining system 440 can utilize turn event information detected by turn detection unit 510 to apply a constraint to the second position determined 940.

For example, as the user travels along path 942, turn detection unit 510 detects the turn to the west and generates a corresponding output signal. Location determining system 440 can determine that the westward turn is not possible if the previous second location was within cubicles 902f or 902g, and that a current second location for mobile communication device 114 must be near the door between corridors 904c and 904a.

In an embodiment, location determining system 440 can apply a constraint to the second location using output signals generated by the stairway detection unit 512 and elevator detection unit 514. For example upon receiving a signal generated by stairway detection unit 512 indicating that the user of mobile communication device 114 is traversing a stairway, location determining system 440 can constrain the location of mobile communication device 114 to stairwell 906 near the estimated second location 950. In response to receiving a signal generated by elevator detection unit 514, location determining system 440 can constrain the location of the user to be inside elevator 908a near estimated second location 950.

Navigation system 100 can be configured to perform methods in accordance with embodiments of the invention. The description of the methods includes a description of additional features of the mobile communication device 114 and navigation system 400 according to embodiments.

IV. Methods

Methods in accordance with embodiments will be described with respect to navigation system 100 of FIG. 1 and mobile communication device 114 of FIGS. 1, 4 and 5, without limitation.

Figure 10:
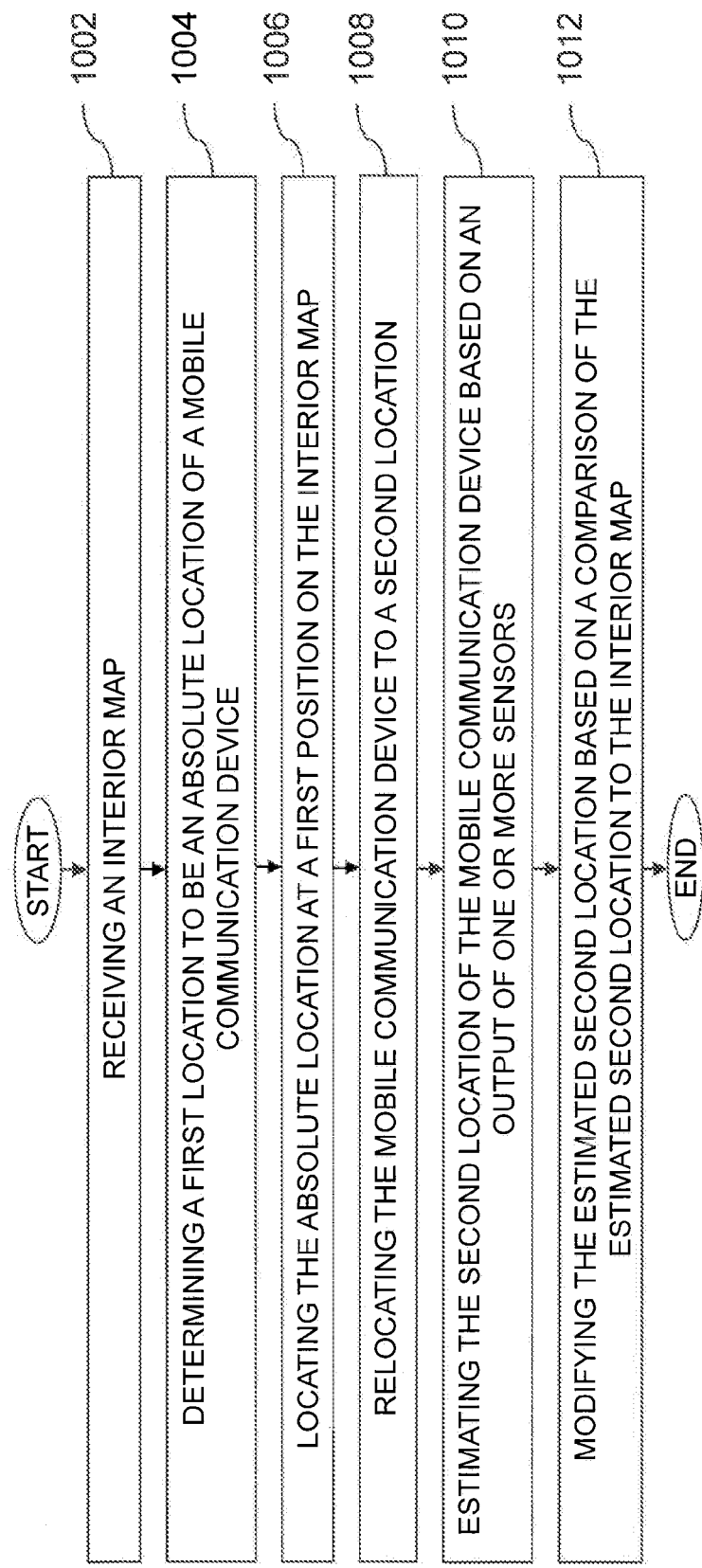
FIG. 10 is a flow chart illustrating a method for determining the location of a mobile communication device, according to an embodiment.

FIG. 10 is a flowchart of an exemplary method 1000 for determining a location of a mobile device in an interior space. For ease of explanation, method 1000 is described with respect to navigation system 100 of FIG. 1 and mobile communication device 114 of FIGS. 1, 4 and 5, but embodiments of the method are not limited thereto.

Method 1000 begins at step 1002 with the receiving of an interior map. In an embodiment, facility mapping server 110 and facility map database 112 access map data for an interior space, e.g., a building, where the map data can include layout information, coordinate information, and images associated with various interior positions. Facility mapping server 110 responds to requests for map data by retrieving data from facility map database 112 and where the map requesting device such as mobile communication device 114, receives the interior map.

Method 1000 continues in step 1004 with determining a first location to be an absolute location for a mobile communication device. In an embodiment, mobile communication device 114 includes absolute location system 420 that is configured to determine an absolute location for mobile communication device 114. As discussed above, absolute location determining system 428 can be configured to obtain an absolute location for mobile communication device 114 in various ways. For example, mobile communication device 114 can obtain location information using a passive localization system, such as bar code 108b, by scanning bar code 108b with an optical sensor. Further location information can be obtained through the use of beacon sensor system 422 to obtain a location for the bar code 108b and to determine the position of bar code 108b to be the absolute location of mobile communication device 114. As discussed above, embodiments of mobile device can use QR codes as components of a passive location system.

Method 1000 continues in step 1006 by locating the absolute location of the mobile station on an interior map. In an embodiment, location display system 450 is configured to retrieve map information from interior mobile mapping database 414 that may also include an interior map that can be displayed on display device 210 of mobile communication device 114. Location determining system 440 is configured to receive the first location determined by absolute location system 420 and to determine the corresponding position on the interior map.

Method 1000 continues in steps 1008 and steps 1010 with relocating the mobile communication device to a second location and sensing the second location of the mobile communication device based on an output of one or more sensors. In an embodiment, a user carries mobile communication device 114 from the first location to a second location while walking through the interior of a building. Mobile communication device 114 can be configured to determine the motion of the device based on one or more sensors onboard the mobile communication device. For example, as described above mobile communication device 114 can include navigation sensor system 432 that is configured to determine the motion and orientation of the mobile communication device 114. Location determining system 440 can be configured to determine an estimated second location for the mobile device based on the information generated by navigation sensor system 432.

In an embodiment, mobile communication device 114 includes a location modifier system 430 configured to use accelerometer, magnetometer, and gyroscope sensors to determine a direction of motion of the mobile communication device, and to implement a pedometer to determine a count of the steps to move from the first location to the second location.

Method 1000 continues in step 1012 with modifying the estimated second location based on a comparison of the estimated second location to the interior map. As described above, location determining system 440 is configured to apply constraints based on interior map information. For example, if there are two possible estimated locations, where one of those locations would require the user to travel through an obstacle such as a wall, location determining system can determine from interior map information that such a possible location is removed from consideration. Method 1000 concludes after step 1012.

Figure 11:
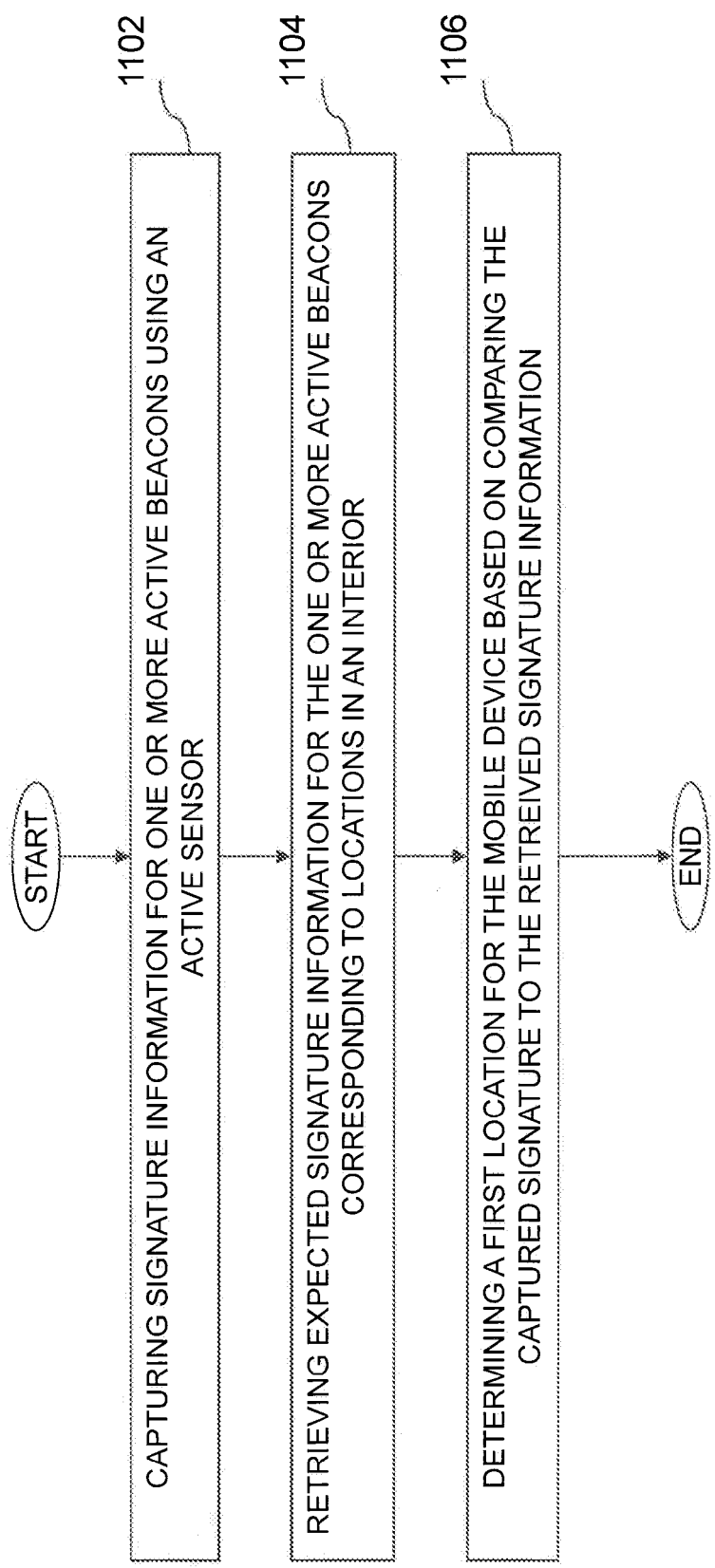
FIG. 11 is a flow chart illustrating a method for determining a first location of a mobile communication device using active localization, according to an embodiment.

FIG. 11 is a flowchart of an exemplary method 1100 for determining an absolute location for a mobile communication device using active localization, according to an embodiment.

In step 1102 of method 1100, a process of capturing signature information for one or more active beacons using a sensor is performed. In an embodiment, mobile communication device receives a signal generated by an active beacon. For example, the received signal can be from a WIFI transmitting device that is located within receiving range of the location of the mobile communication device. The WIFI signal is a radio frequency signal that has a signature that includes the signal strength at the absolute location of mobile communication device 114 and a MAC address associated with the transmitting device.

In step 1104 of method 1100, expected signature information for the one or more active beacons corresponding to receiving locations in an interior is retrieved. In an embodiment, the map information stored in mobile mapping database 414 includes information describing the signal signature information, e.g. the MAC address and expected signal strength information for the WIFI transmitting devices for locations in the interior of a facility. As described above, beacon sensor system 422 can be configured to retrieve the signature information from mobile mapping database 414. In some embodiments, such signature information need not include any payload information, but only that necessary to identify the location of a passive or active beacon device. Further, in some embodiments, no personal data need be transmitted, and privacy protections are provided for any user data including, for example, anonymization of personally identifiable information, aggregation of data, filtering of sensitive information, encryption, hashing or filtering of sensitive information to remove personal attributes, time limitations on storage of information, or limitations on data use or sharing.

Method 1110 continues in step 1106 with determining a first location for a mobile device by comparing the captured signature information with the retrieved signature information. In an embodiment, beacon sensor system 422 is configured to determine a location by comparing the received signatures for the one or more WIFI transmitter devices to the signature data retrieved from interior mobile mapping database 414. Beacon sensor system 422 determines an estimated location to be the position where the measured signatures for the one or more beacons best match the retrieved signature information.

Figure 12:
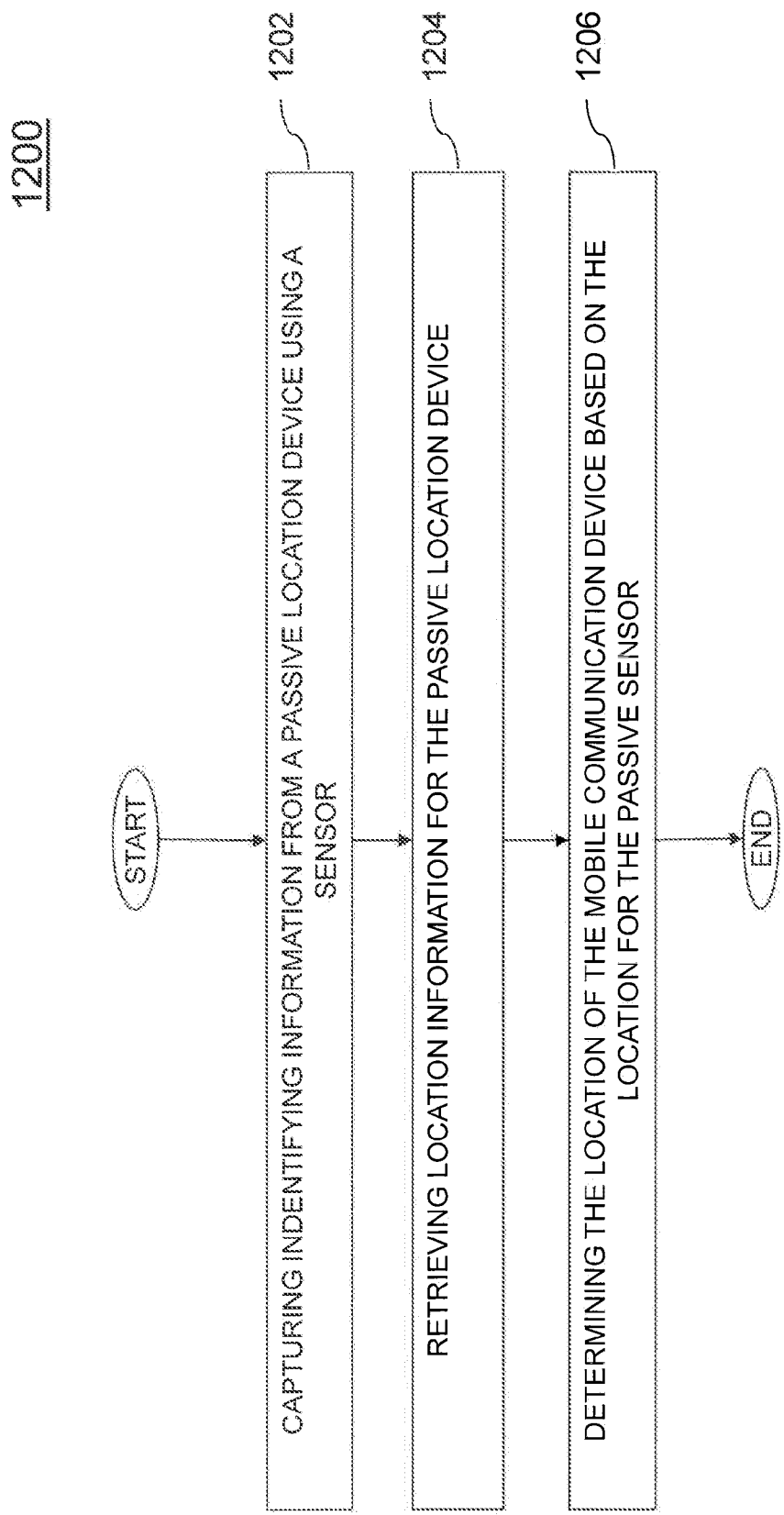
FIG. 12 is a flow chart illustrating a method for determining a first location of a mobile communication device using passive localization, according to an embodiment.

FIG. 12 is a flowchart of an exemplary method 1200 for determining an absolute location for a mobile communication device using passive localization, according to an embodiment.

In step 1202 of method 1200, a process of capturing identifying information from a passive location device using a sensor is performed. In an embodiment, mobile communication device 114 scans a passive location device such as a bar code 1302 or a QR code 1304 bearing device (shown in FIG. 13) affixed to a location in a facility. In an embodiment, passive sensor system 424 can be configured to retrieve information encoded in the passive location.

In step 1204 of method 1200, retrieving location information for the passive location device is performed. In an embodiment, location information is encoded into passive sensor information. For example, bar code 1302 and QR code 1304 each encode information describing the location as "First Floor Conference Room."

In an embodiment, the information encoded in the passive location device is an identifier for the passive location device. Passive sensor system 424 can be configured transmit a request to interior mobile mapping system 410 that includes the identifier, where interior mobile mapping system 410 can be configured to retrieve location information associated with the passive location device identifier and transmit the location information to passive sensor system 424, or mobile communication device 114.

Method 1200 continues in step 1206 with determining a first location for a mobile communication device based on the location information for the passive localization device. Beacon sensor system 424 can be configured to accept the location for the passive localization device as an absolute location for mobile communication device 114.

V. Example Computer System Implementation

Embodiments shown in FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 14:
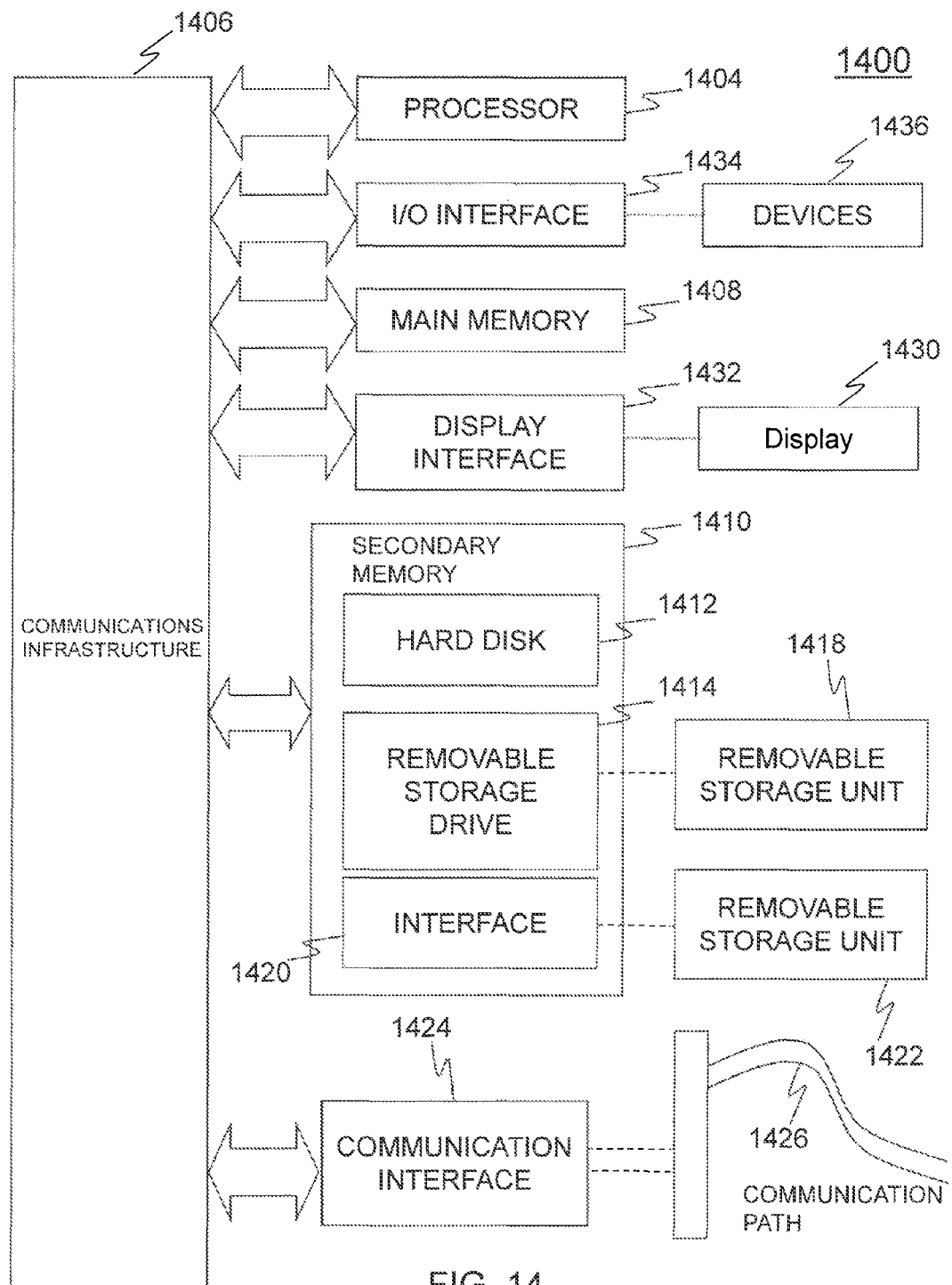
FIG. 14 is a diagram of an example computer system in which embodiments can be implemented.

FIG. 14 illustrates an example computer system 1400 in which embodiments, or portions thereof, may be implemented as computer-readable code. For example, the mobile communication device shown in FIGS. 1 and 2, including modules for implementing the functions and methods shown in FIGS. 4, 5, 10, 11, and 12 can be implemented in computer system 1400 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-5.

If programmable logic is used, such logic may execute on a commercially available processing platform or a special purpose device. For example, logic unit 214 of mobile communication device 114 can be implemented using programmable logic. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1400. After reading this description, it will become apparent to a person skilled in the relevant art how to implement embodiments of the present invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged or performed concurrently without departing from the spirit of the disclosed subject matter.

Processor device 1404 may be a special purpose or a general purpose processor device. As will be appreciated by persons skilled in the relevant art, processor device 1404 may also be a single processor in a multi-core/multiprocessor system, such system operating alone, or in a cluster of computing devices operating in a cluster or server farm. Processor device 1404 is connected to a communication infrastructure 1406, for example, a bus, message queue, network, or multi-core message-passing scheme.

Computer system 1400 also includes a main memory 1408, for example, random access memory (RAM), and may also include a secondary memory 1410. Secondary memory 1410 may include, for example, a hard disk drive 1412, removable storage drive 1414. Removable storage drive 1414 may comprise a floppy disk drive, a magnetic tape drive, an optical disk drive, a flash memory, or the like. The removable storage drive 1414 reads from and/or writes to a removable storage unit 1418 in a well known manner. Removable storage unit 1418 may comprise a floppy disk, magnetic tape, optical disk, etc. which is read by and written to by removable storage drive 1414. As will be appreciated by persons skilled in the relevant art, removable storage unit 1418 includes a computer usable storage medium having stored therein computer software and/or data.

Computer system 1400 (optionally) includes a display interface 1402 (which can include input and output devices such as keyboards, mice, etc.) that forwards graphics, text, and other data from communication infrastructure 1406 (or from a frame buffer not shown) for display on display unit 1430.

In alternative implementations, secondary memory 1410 may include other similar means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Communications interface 1424 may include a modem, a network interface (such as an Ethernet card), a communications port, a PCMCIA slot and card, or the like. Software and data transferred via communications interface 1424 may be in the form of signals, which may be electronic, electromagnetic, optical, or other signals capable of being received by communications interface 1424. These signals may be provided to communications interface 1424 via a communications path 1426. Communications path 1426 carries signals and may be implemented using wire or cable, fiber optics, a phone line, a cellular phone link, an RF link or other communications channels.

In this document, the terms "computer program medium" and "computer readable medium" are used to generally refer to storage media such as removable storage unit 1418, removable storage unit 1422, and a hard disk installed in hard disk drive 1412. Computer program medium and computer readable medium may also refer to memories, such as main memory 1408 and secondary memory 1410, which may be memory semiconductors (e.g. DRAMs, etc.).

Computer programs (also called computer control logic) are stored in main memory 1408 and/or secondary memory 1410. Computer programs may also be received via communications interface 1424. Such computer programs, when executed, enable computer system 1400 to implement embodiments as discussed herein. In particular, the computer programs, when executed, enable processor device 1404 to implement the processes of embodiments of the present invention, such as the stages in the methods illustrated by flowcharts 1000, 1100, and 1200 of FIGS. 10, 11, and 12, respectively, and discussed above. Accordingly, such computer programs represent controllers of the computer system 1400. Where embodiments are implemented using software, the software may be stored in a computer program product and loaded into computer system 1400 using removable storage drive 1414, interface 1420, and hard disk drive 1412, or communications interface 1424.

Embodiments of the invention also may be directed to computer program products comprising software stored on any computer readable medium. Such software, when executed in one or more data processing devices, causes a data processing device(s) to operate as described herein. Embodiments of the invention employ any computer useable or readable medium. Examples of non-transitory computer readable media include, but are not limited to, primary storage devices (e.g., any type of random access memory), secondary storage devices (e.g., hard drives, floppy disks, CD ROMS, ZIP disks, tapes, magnetic storage devices, and

VI. Variations

As would be understood by a person skilled in the art based on the teachings herein, several variations of the above described features determining the location of a mobile communication device in a facility can be envisioned. These variations are within the scope of embodiments of the present invention. For example, one skilled in the art can envision several variations to facility and interior mapping systems illustrated in FIGS. 1 and 4. For the purpose of illustration only and not limitation, one variation is provided herein.

For example, in a variation of the invention, storage of map information may be maintained primarily on facility mapping server 110 and facility map database 114. Mobile mapping system 410 can be configured to request map information from facility mapping server 110 in response to request from the location determining modules of navigation system 400.

VII. Conclusion

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   receiving, by one or more processors, an interior map that describes a layout including pathways traversable by persons;
   determining, by one or more processors, a first location to be an absolute location of a mobile communication device;
   locating, by one or more processors, the absolute location at a first position on the interior map;
   subsequently to the mobile communication device being relocated to a second location, estimating, by one or more processors, the second location of the mobile communication device based on an output of one or more sensors; and
   modifying, by one or more processors, the estimated second location based on a comparison of the estimated second location to the interior map, including constraining, by one or more processors, the estimated second location based on possible physical movement of the mobile communication device through the pathways in accordance with the interior map, between the first position and the second location.

2. The method of claim 1, wherein determining the first location to be an absolute location is performed using one of passive localization or active localization.

3. The method of claim 2, wherein using passive localization includes detecting and interpreting a location-based one or two dimensional barcode.

4. The method of claim 2, wherein using passive localization includes capturing interior images.

5. The method of claim 2, further comprising:
   receiving information describing a known signal signature associated with the absolute location, wherein the known signal signature is based on a signal strength of a received signal and a unique identifier associated with the signal.

6. The method of claim 5, wherein the active localization comprises:
   measuring a signal strength of the received signal using the mobile communication device;
   detecting a unique identifier associated with the received signal; and
   comparing the measured signal strength and the detected unique identifier with the information describing the known signal signature; and
   determining the absolute location based on the comparing of the measured signal strength and the detected unique identifier with the information describing the known signal signature.

7. The method of claim 1, wherein estimating the second location of the mobile communication device based on an output of one or more sensors includes measuring an acceleration, an orientation, and a direction of motion of the mobile communication device.

8. The method of claim 1, wherein modifying the estimated second location includes:
   determining physical movement of the mobile communication device from the first position along one of the pathways,
   determining that the estimated second location is within a room, and
   determining whether the room is directly accessible from the one of the pathways; wherein the estimated second location is further constrained by whether the room is directly accessible from the one of the pathways.

9. The method of claim 1, wherein the possible physical movement is further constrained by walking or running speed of a user.

10. The method of claim 1, wherein modifying the estimated second location includes:

in response to determining that traveling to the estimated second location from the first location requires traveling through a physical obstacle, removing the estimated second location from consideration.

11. A system for indoor navigation, comprising:
an interior mapping system configured to store a database of interior maps that describe layouts including pathways traversable by persons;
an absolute location system configured to determine a first position of a mobile communication device to be an absolute location, wherein the interior mapping system associates the absolute location with a position on an interior map;
a sensor system configured to estimate a second location of the mobile communication device subsequent to a relocating of the mobile communication device from the first position; an
a location modifier system configured to modify the estimated second location based on a comparison of the estimated second location to the interior map, wherein the location modifier system constrains the estimated second location based on possible physical movement of the mobile communication device through the pathways in accordance with the interior map, between the first position and the second location.

12. The system of claim 11, wherein the absolute location system determines the first position to be the absolute location based on one of passive localization or active localization.

13. The system of claim 12, wherein the absolute location system determines the first position to be the absolute location based on passive localization using a location-based one or two dimensional barcode.

14. The system of claim 12, wherein the absolute location system determines the first position to be the absolute location based on passive localization using interior images.

15. The system of claim 12, further configured to:
generate a signal signature associated with the absolute location, wherein the signal signature is based on a signal strength of a received signal and a unique identifier associated with the received signal.

16. The system of claim 15, wherein the active localization comprises:
the mobile communication device configured to detect a signal strength of a signal, and a unique identifier of the signal;
compare the detected signal strength and the unique identifier with the signal signature; and
determine the absolute location based on the detected signal strength and the unique identifier.

17. The system of claim 11, wherein the absolute location system determines the first position to be the absolute location based on active location using active location beacons.

18. The system of claim 11, wherein the sensor system comprise one or more of:
an accelerometer;
a gyroscope;
an audio sensor;
a compass;
a camera; and
a motion detector.

19. The system of claim 11, wherein the sensor system comprise an accelerometer and a compass configured to simulate a virtual pedometer.

20. A computer program product, comprising a non-transitory computer readable storage medium, the non-transitory computer readable storage medium having embodied thereon computer readable program code for interior navigation, the readable program code comprising:
first computer readable program code for causing the computer to receive an interior map that describes a layout including pathways traversable by persons;
second computer readable program code for causing the computer to determine a first location to be an absolute location of a mobile communication device;
third computer readable program code for causing the computer to locate the absolute location with a first position on the interior map;
fourth computer readable program code for causing the computer to estimate the second location of the mobile communication device based on an output of one or more sensors in response to the mobile station being relocated to the second location; and
fifth computer readable program code for causing the computer to modify the estimated second location based on a comparison of the estimated second location to the interior map, including constraining the estimated second location based on possible physical movement of the mobile communication device through the pathways in accordance with the interior map, between the first position and the second location defined by the interior map.

* * * * *